United States Patent Office 3,488,302
Patented Jan. 6, 1970

3,488,302
AMBIENT TEMPERATURE STABLE MIXTURE OF ISOCYANATE PREPOLYMER AND SOLID POLYOL
Charles Odus Pyron, 587 E. Dale Drive, Dayton, Ohio 45415
No Drawing. Filed June 20, 1966, Ser. No. 558,567
Int. Cl. C08g 22/06
U.S. Cl. 260—9    11 Claims

ABSTRACT OF THE DISCLOSURE

Compositions stable at ambient atmospheric temperatures upon exclusion of moisture, which can be converted to resins by heating, comprise a mixture of a fluid isocyanate terminated prepolymer (said prepolymer being prepared from stoichiometrical proportions of an organic compound having at least two isocyanate groups with an organic compound having at least two reactive hydrogen atoms per molecule and having a molecular weight above about 400) and a normally solid organic polyol dispersed therein in a solid finely divided state, the molecular ratio of reactive hydrogen in the solid polyol to terminal isocyanate groups in the prepolymer being about 2/1 to 100/1. Such mixtures are packaged in a container sealed airtight to exclude moisture. Fillers may be present to stabilize the dispersed state of the solid polyol. The compositions are useful as caulks and sealants and can be applied as ribbons or coatings and by heat curing are firmly bonded to the surfaces. In use, the applied mixture is heated to curing temperature below the melting point of the solid polyol present and forms a rubbery resin by surface reaction with the polyol particles, the excess polyol acting as a filler.

DESCRIPTION OF INVENTION

The present invention relates to stable plastic compositions capable of long storage without substantial change, and capable of reacting or curing under controlled conditions to form polyurethane elastomers or solid resins, and to the curing methods.

It is known that diisocyanates of organic radicals react with compounds having reactive hydrogen, for example, organic diamines, diols, diol terminated ethers, dicarboxylic acids, and esters of the latter with triols or higher alcohols, at room temperature to form addition or condensation products. Such addition or condensation products are amides, urethane esters or substituted ureas, and are called polyurethane prepolymers. When the reaction is carried out with an excess of isocyanate radical over reactive hydrogen the prepolymers have terminal isocyanate groups and are designated as isocyanate terminated prepolymers. Upon heating such prepolymers with or without further quantities of compounds having reactive hydrogen, resins are produced.

Caulks and sealants are used in automobile bodies between adjacent attached metal parts, such as the front fenders and body, to exclude moisture and prevent noise due to relative motion between the parts. The material used for such purpose must have a sufficiently elastic character so it will not break out, must have good adherence to metal, and must accept the finish coats used on the automobile without causing discoloring, cracking, peeling, or otherwise deleteriously affecting the finish coat.

The resins produced by the curing of polyurethane prepolymers, with or without addition of compounds to promote cross linking, are known to bond strongly to metals. However, the polyurethane prepolymers cure too slowly in air to be useful in automobile manufacturing. Also, mixtures of isocyanates of organic radicals and polyols proposed as adhesives, or of polyurethane prepolymers and polyols and the like, react relatively rapidly so they must be used soon after they are prepared and they cannot be stored. Furthermore, such mixtures generally are too fluid to serve as seam sealants and the like.

Caulking compounds and sealants, to be practical as preformed compositions for such purpose, should have a shelf life on the order of three weeks or longer, and should cure to a tough elastic non-tacky resin which can be painted over by primers and other finishing materials without having a deleterious effect on the finish. Heretofore the art has not been able to produce any polyurethane type composition having the required stability.

It is an object of this invention to provide stable plastic mixtures comprising isocyanate terminated prepolymers and compounds having plural (two or more) reactive hydrogens, which mixtures have a relatively long shelf life, and can be reacted and cured to form polyurethane resins. Such compositions are useful as sealants or caulks, and can be applied as extruded ribbons or as coatings to the parts to be sealed, and then cured to form elastomeric resins firmly bonded to the surfaces.

The compositions of the present invention comprise a mixture of a normally solid organic compound, having two or more hydroxyl groups, dispersed below the melting point of the solid in a fluid isocyanate terminated prepolymer formed by reaction of an organic compound having two or more isocyanate groups on the organic radical with a compound of moderately high molecular weight having at least two reactive hydrogen atoms in its molecule, the ratio of reactive hydrogen in the solid to terminal isocyanate groups in the prepolymer being about 2/1 to 100/1. I use the term organic diisocyanate to desgnate such organic compounds having two isocyanate groups on the organic radical, and the term organic polyisocyanate where more than two isocyanate groups are present. The compositions of this invention, unexpectedly, have a long shelf life at normal ambient atmospheric temperatures, and can be stored if moisture is exclude, for long periods. Such a mixture is used by stirring (if settling has occurred), applying the mixture to the parts to be sealed, in the form of an extruded ribbon or coating, and heating the mixture to bring about formation of the solid polymer. However, such heating to form the solid polymer must not exceed the melting point of the solid organic compound dispersed therein. In general, a temperature on the order of about 225° F. to 400° F. may be employed to set or cure the mixture to form the resin, so that the selected solid compound must have a melting point above the particular temperature employed in forming the resin. The mixtures of this invention can be cured or resinified by exposure to air, but at a much slower rate than by the application of heat. The methods of curing the mixtures to form the resin are also part of this invention.

FORMATION OF THE PREPOLYMER

Any of the known organic diisocyanates or polyisocyanates may be employed in forming the prepolymer. The term aryl compound having at least two isocyanate groups as employed herein includes aralkyl compounds having isocyanate groups. Examples of organic diisocyanates are the commercial toluene diisocyanates, which are mixtures of 2,4- and 2,6-toluene diisocyanates, dimerized toluene diisocyanate, hexamethylene diisocyanate, the diisocyanate containing as the organic radical a dimeric fatty acid, for example, the product known commercially as dimeryldiisocyanate, diphenylmethane diisocyanate and its dimethyl derivatives, dicyclohexylmethane-4,4-diisocyanate, diparaxylylmethane-4,4'-diisocyanate, naphthylene-1,4-( or 1,5- or 2,7)-diisocyanates, fluorene-2,7-diisocyanate, chrysene-2,8 - diisocyanate, chlorophenylene - 2,4 - diisocyanate, diphenylene-4,4'-diisocyanate and its derivatives containing nuclear substituents, 2-nitro diphenylene-4,4'-diisocyanate, cyclohexylphenyl-4,4'-diisocyanate, and mixtures thereof. Also usable are triphenylmethane triisocyanate, trimerized toluene diisocyanate, and the polymethylene polyphenyl isocyanates which are byproducts in the production of certain of the above named diisocyanates, and which are commercially available. In forming the polyurethane prepolymer, it is preferred to use a slight excess over stoichiometrical proportion of isocyanate radicals to reactive hydrogen atoms (on the order of about 2.1/1) so as to provide isocyanate terminated prepolymers.

In general, the moderately high molecular weight compound or compounds having reactive hydrogen selected to react with organic di- and poly-isocyanate compounds to form prepolymers should have a molecular weight of at least about 400, the preferred molecular weight being in the range of about 2000 to 7000. The prepolymers are essentially linear compounds and are viscous liquids. Some cross linking may be involved but where the compositions are intended for extrusion to form a ribbon, a too viscous condition is not desired. Examples of moderately high molecular weight compounds having at least two reactive hydrogen atoms in the molecule (which are reacted with organic isocyanates to form the prepolymers) include commercial polyoxyalkylenes having at least two terminal hydroxy groups in the molecule, such as polyethylene glycols, polypropylene glycols, or polybutylene glycols, polyesters, polyesteramides, and polyalkylene ether glycols, and which have an average molecular weight of about, for example, 400 or 950 or 2000 or 4000; polyoxyalkylenes having three hydroxy groups in the molecule of an average molecular weight of about 430 or 6000 or 4500; castor oil, tung oil and their alkyd modifications, dihydroxy terminated polyesters produced, for example, by esterification of adipic acid, sebacic acid, and other dicarboxylic acids with long chain polyoxyalkylene glycols, and polyepsilon caprolactonediols, long chain alkyl diamines, and the like; and copolymers of vinyl ester and an ethylenic unsaturated compound in which some or all of the ester groups are hydrolized to provide hydroxy groups, for example, a partially hydrolized copolymer of vinyl acetate and vinyl chloride. The preferred reactive hydrogen compounds are the polyoxyalkylene diols or triols of the proper molecular weights, as these are relatively inexpensive.

SOLID COMPOUNDS

As pointed out above, the solid compounds selected for admixture with the prepolymers should have at least two reactive hydrogen atoms, and should have a melting point above the temperature employed in effecting the cure to form a resin. If the melting point of the solid is exceeded the melted solid appears to act as a plasticizer that imparts a soft gummy character to the cured resin. In general, a melting point above 130° F. is desirable because for some uses stability of the mixture is tested at 130° F. However, as temperatures on the order of 225° to 400° F. are employed in effecting curing, the preferred compounds have melting points above such range. In general, the solid compound should be finely divided so as to be dispersed easily in the fluid prepolymer. It is preferred to permanently suspend the solid in the prepolymer so as to avoid the need for mixing before use, and accordingly, a fineness of about 325 mesh is preferred. The solid is present in a molecular ratio providing reactive hydrogen to terminal isocyanate groups in the range of about 2/1 to 100/1, or higher, a range of about 5/1 to 30/1 being usable for many purposes. It is essential to provide an excess over theoretical of the solid compound in order to insure that there is a sufficient reaction with the prepolymer in the curing step.

The preferred solid compounds are those having two or more hydroxyl groups. Examples of such compounds are commercial pentaerythritol, which may be relatively pure or may contain varying amounts of di- and tri-pentaerythritol; dipentaerythritol; tripentaerythritol; the methyl alpha d-glucoside of corn starch, (which is a tetrahydroxy compound) corn starch, sucrose (M.P. 170° C.), lactose (M.P. 202° C.) d-mannitol (M.P. 166° C.), anhydrous sorbitol (M.P. 112° C.), dulcitol (M.P. 188.5° C.) and erythritol (M.P. 120° C.). Other solid compounds, such as copolymers of vinyl ester with ethylenic unsaturated compounds having three or more ester groups replaced by hydroxyl groups, and primary and secondary diamines having long aliphatic chains of carbon atoms, with or without interrupting ether linkages, may be used, provided they have a sufficiently high molecular weight and melting point.

As above explained, the quantity of solid material employed should be in substantial excess over the theoretical stoichiometrical ratio. Thus, for example, when forming a prepolymer by condensing toluene diisocyanate (mol. wt. 170) with a diol of molecular weight 2000, the addition of two isocyanate groups to the diol results in a linear compound of theoretical molecular weight 2340 having two terminal isocyanate groups. As a solid tetrol has four alcohol groups, only one half mole of the tetrol is required to satisfy the isocyanate groups. However, according to this invention there is present at least twice the stoichiometrical amount, and the ratio may go as high as 100 times (or even higher) the theoretical amount. The preferred ratio is in the range of five to thirty times the theoretical reactive hydrogen to terminal isocyanate groups.

I believe the stability of my mixtures is due to the relative chemical inactivity of the polyol in the solid state. The reactivity of the solid polyol is increased with increase in temperatures, but as the mixture being cured cannot be agitated, when used for some of the purposes contemplated, it is desirable that the solid be distributed throughout the mixture in a fine state. I believe the reaction at the curing temperature is a surface reaction between the prepolymer and the polyol and the excess of polyol acts as a filler. However, I do not wish to be confined to theoretical considerations in claiming my invention.

If desired, especially in connection with the more brittle species of the invention, the compositions may include plasticizers, such as chlorinated paraffin wax, chlorinated biphenyl, dibutyl phthalate, and the like. The compositions may contain catalysts to allow resin formation at lower temperatures. Examples of suitable catalysts include dibutyltin dilaurate, 2, 4, 6-trimethylpiperazine, and stannous octoate. Some catalysts reduce the shelf life of the composition, so that in using a catalyst the required shelf life should be taken into account. It is preferred to add fillers to the less viscous mixtures to avoid settling of the polyol, examples of such fillers being colloidal silica, calcium carbonate having a fineness to pass a 325 mesh screen, calcium silicate and the like.

The invention is further illustrated by the following examples of preferred embodiments.

EXAMPLE 1

1.05 mole of a commercial toluene diisocyanate containing about 80 percent by weight of the 2,4-isomer and 20 percent of the 2,6-isomer is reacted at a suitable temperature (up to about 200°) with one half mole of a commercial polyglycol 2000 (polyoxyethylene glycol having an average molecular weight of 2000), to produce a fluid prepolymer having an estimated molecular weight of about 2340.

One mole of such prepolymer is thoroughly mixed with 2½ moles pentaerythritol, and about 5% of colloidal silica (based on the prepolymer) to control the viscosity of the mixture and prevent settling. The mixture is packaged in suitable containers which can be sealed air tight such as drums or cans, or aluminum foil lined cardboard caulking cartridges sealed at the pressure and nozzle ends in the usual manner.

EXAMPLE 2

1.05 mole of the prepolymer described in Example 1 is thoroughly mixed with 2½ moles mannitol and about 5% colloidal silica.

EXAMPLE 3

1.05 mole of a commercial diphenylmethane diisocyanate is reacted with one half mole of a commercial polyoxypropylene glycol having a molecular weight of about 4000 at a suitable temperature to form a fluid prepolymer having an estimated molecular weight of about 4500. This is then mixed with 10 moles commercial finely divided mannitol. Suitable fillers to produce the desired viscosity may be incorporated in the composition.

EXAMPLE 4

1.05 mole of commercial dicyclohexyl methane diisocyanate is reacted with one half mole of the polyglycol 2000 described in Example 1 in the presence of a suitable catalyst, for example, dibutyltin dilaurate at a suitable temperature—for example, up to about 250° F., to form a fluid prepolymer. This prepolymer is then mixed with about ten moles of finely divided pentaerythritol. Suitable fillers may be added to control the viscosity.

In use, the composition is applied as a ribbon, for example, to the body seams of an automobile, after the metal is Bonderized, and the material is then heated to about 300° F. to cure or set the composition to a non-tacky, strongly adherent resin. The automobile body then can be coated over the metal and sealant with primers, synthetic enamels, and the other finishing materials in the usual manner.

Certain of the compositions are useful as adhesives, and such use is not excluded from my invention.

In the automotive industry, an accelerated test for stability consists of holding the composition in its container at 130° F. for 72 hours. For example, the composition of Example 1, after storage in its container at 130° F. for seven days showed no appreciable increase in viscosity. This is a more severe test than the present published stability requirements in the automotive industry for such materials. The composition cured at 300° F. in one hour to a rubbery white resin. The desirable physical properties of this resin are here given.

Tensile strength 200 pounds per square inch (tested by ASTM D-429 test).
Bonded shear strength—aluminum to aluminum, 300 pounds per square inch.
Steel to steel—325 pounds per square inch (tested with one square inch overlap—shear point separation is two inches per minute).

In each case, the resin ruptured while maintaining adhesion to the metal surfaces.

I claim:

1. A package comprising a container, and a mixture in the container, said container being sealed airtight to exclude moisture, and said mixture comprising an organic polyol normally in the solid state below about 225° F. dispersed in finely divided solid state in a fluid isocyanate terminated prepolymer at ambient atmospheric temperature said prepolymer being formed by reaction of an organic compound having at least two isocyanate groups with an organic compound having at least two reactive hydrogen atoms per molecule and having a molecular weight above about 400, said mixture being non-reactive in the ambient atmospheric temperature range in said sealed container, the molecular ratio of reactive hydrogen in the solid polyol to terminal isocyanate groups in the prepolymer being from about 2/1 to about 100/1.

2. A package as specified in claim 1 wherein the organic compound having at least two isocyanate groups is a toluene diisocyanate.

3. A package as specified in claim 1 wherein the organic compound having at least two isocyanate groups is a diphenylmethane diisocyanate.

4. A package as specified in claim 1 wherein the organic compound having at least two reactive hydrogen atoms per molecule is a hydroxy terminated polyoxyalkylene compound having a molecular weight of about 2000 to 7000.

5. A package as specified in claim 4 wherein the polyoxyalkylene compound is a diol.

6. A package as specified in claim 1 wherein said solid organic polyol is an erythritol.

7. A package as specified in claim 1 wherein said solid polyol is methyl alpha d-glucoside of cornstarch.

8. A package as specified in claim 6 wherein the ratio of erythritol to prepolymer is about five moles of hydroxy groups to each terminal isocyanate group.

9. A package as specified in claim 1 containing a filler in the mixture to avoid settling of the organic solid polyol.

10. A package as specified in claim 9 wherein the filler comprises colloidal silica.

11. A package as specified in claim 1 wherein the molecular ratio of reactive hydrogen in said solid polyol to terminal isocyanate groups is from about 5/1 to about 30/1.

References Cited

UNITED STATES PATENTS

| | | | |
|---|---|---|---|
| 3,280,048 | 10/1966 | Griffin | 260—2.5 |
| 2,355,245 | 8/1944 | Schreiber | 260—9 |
| 2,902,478 | 9/1959 | Anderson. | |
| 2,908,657 | 10/1959 | Boggs | 260—9 |
| 3,167,538 | 1/1965 | Kaiser et al. | |
| 3,049,513 | 8/1962 | Damusis et al. | |
| 3,165,508 | 1/1965 | Otey et al. | 260—233.3 |
| 3,274,160 | 9/1966 | Ellegast et al. | |
| 3,310,533 | 3/1967 | McElroy | 260—9 |
| 3,321,419 | 5/1967 | Kennedy | 260—9 |
| 3,386,931 | 6/1968 | Smart et al. | 260—16 |

WILLIAM H. SHORT, Primary Examiner

E. WOODBERRY, Assistant Examiner

U.S. Cl. X.R.

206—84; 260—75, 77.5